United States Patent
Eungard et al.

(10) Patent No.: US 7,594,290 B2
(45) Date of Patent: Sep. 29, 2009

(54) DOCK LEVELER BOTTOM PAD

(75) Inventors: William C. Eungard, Waterford, WI (US); William Amundson, Pewaukee, WI (US); Laura M. Smith, Milwaukee, WI (US)

(73) Assignee: 4Front Engineered Solutions, Inc., Carrolton, TX (US)

( * ) Notice: Subject to any disclaimer, the term of this patent is extended or adjusted under 35 U.S.C. 154(b) by 0 days.

(21) Appl. No.: 11/513,202

(22) Filed: Aug. 31, 2006

(65) Prior Publication Data

US 2008/0052843 A1    Mar. 6, 2008

(51) Int. Cl.
*E01D 1/00* (2006.01)
(52) U.S. Cl. ............ 14/69.5; 277/921; 52/2.14
(58) Field of Classification Search ............ 14/69.5, 14/71.1, 71.3; 277/921, 637; 52/2.12, 2.14, 52/173.2, 173.1
See application file for complete search history.

(56) References Cited

U.S. PATENT DOCUMENTS

| | | | |
|---|---|---|---|
| 3,763,514 A * | 10/1973 | Bishop ............ 14/71.3 |
| 4,422,199 A | 12/1983 | Frommelt |
| 4,682,382 A | 7/1987 | Bennett |
| 4,689,844 A * | 9/1987 | Alivizatos ............ 5/702 |
| 5,001,799 A | 3/1991 | Alexander et al. |
| 5,313,681 A | 5/1994 | Alexander |
| 5,388,295 A * | 2/1995 | Sarkozi ............ 5/630 |
| 5,396,676 A | 3/1995 | Alexander et al. |
| 5,842,475 A * | 12/1998 | Duback et al. ............ 128/846 |
| 5,871,527 A * | 2/1999 | Gubernick ............ 607/114 |
| 6,073,402 A | 6/2000 | Moody |
| 6,491,038 B1 * | 12/2002 | McQueen ............ 128/869 |
| 6,502,268 B2 | 1/2003 | Ashelin et al. |
| 6,654,976 B2 | 12/2003 | Digmann et al. |
| 7,146,673 B1 | 12/2006 | Digmann et al. |
| 7,334,281 B2 | 2/2008 | Digmann et al. |
| 2007/0101517 A1 | 5/2007 | Digmann et al. |
| 2007/0101518 A1 | 5/2007 | Digmann et al. |
| 2007/0101519 A1 | 5/2007 | Digmann et al. |

* cited by examiner

*Primary Examiner*—Raymond W Addie
(74) *Attorney, Agent, or Firm*—Baker & Hostetler LLP (57) ABSTRACT

A dock leveler sealing system that includes a barrier configured to be attached to a dock leveler and a hinged region located in the barrier and configured to facilitate one portion of the barrier moving with respect to a second portion of the barrier. The dock leveler sealing system also includes a biasing apparatus attached to the barrier and configured to position the first portion of the barrier at a bias relative to the second portion of the barrier. Also, a method of providing a seal between a loading dock and an area outside of the loading dock.

10 Claims, 11 Drawing Sheets

DOCK LEVELER BOTTOM PAD

FIELD OF THE INVENTION

The present invention relates generally to dock loading and unloading equipment. More particularly, the present invention relates to sealing systems for dock levelers.

BACKGROUND OF THE INVENTION

Dock levelers, both of the horizontal and vertical varieties, are commonly found in the loading docks of warehouses and other facilities where large items are regularly loaded onto and/or unloaded off of trucks or other freight vehicles. Typically, while in operation, a dock leveler extends between a first location on or immediately adjacent to the floor of the loading dock and a second location either in or immediately adjacent to the interior of a freight vehicle that is being loaded or unloaded. The dock leveler then provides a bridge between the loading dock and the bed of the freight vehicle. The position of the dock leveler is adjusted in order to accommodate for variations in the elevation of the freight vehicle's interior relative to the floor of the loading dock as the freight vehicle is being loaded and/or unloaded.

One shortcoming of dock levelers in general has to do with the fact that they are not continuous, solid structures. As such, dock levelers allow environmental conditions (e.g., cold air, rain, snow, sleet, etc.) to enter the loading docks to which they are attached.

Accordingly, it would be desirable to provide novel dock leveler sealing systems that impede adverse environmental conditions from entering the loading docks to which the dock levelers are attached. It would also be desirable to provide methods for manufacturing such dock leveler sealing systems.

SUMMARY OF THE INVENTION

The foregoing needs are met, to a great extent, by the present invention, wherein in one embodiment thereof, a dock leveler sealing system is provided. The dock leveler sealing system includes a barrier configured to be attached to a dock leveler. The dock leveler sealing system also includes a hinged region located in the barrier and configured to facilitate one portion of the barrier moving with respect to a second portion of the barrier. The dock leveler sealing system further includes a biasing apparatus attached to the barrier and configured to position the first portion of the barrier at a bias relative to the second portion of the barrier.

In accordance with another embodiment of the present invention, a method of providing a seal between a loading dock and an area outside of the loading dock is provided. The method includes attaching a barrier to a dock leveler. The method also includes including a hinged region in the barrier to facilitate one portion of the barrier moving with respect to a second portion of the barrier. The method further includes biasing the first portion of the barrier relative to the second portion of the barrier.

In accordance with yet another embodiment of the present invention, another dock leveler sealing system is provided. This dock leveler sealing system includes sealing means for providing a seal between a dock leveler and a pit floor, wherein the sealing means is configured to be attached to the dock leveler. This dock leveler sealing system also includes facilitating means for facilitating one portion of the sealing means moving with respect to a second portion of the sealing means, wherein the facilitating means is located in the sealing means. This dock leveler sealing system further includes biasing means for positioning the first portion of the sealing means at a bias relative to the second portion of the sealing means, wherein the biasing means is attached to the sealing means.

In accordance with still another embodiment of the present invention, yet another dock leveler sealing system is provided. This dock leveler sealing system includes a barrier configured to be attached to a dock leveler. This dock leveler sealing system also includes a biasing apparatus attached to the barrier and configured to position a first portion of the barrier at a bias relative to a second portion of the barrier, wherein the biasing apparatus is further configured to bias the barrier even when not directly attached to the dock leveler.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The invention will now be described with reference to the drawing figures, in which like reference numerals refer to like parts throughout. FIGS. 1-4 illustrate cross-sectional views of a dock leveler system 10 according to a first embodiment of the present invention. It should be noted that, although vertical dock levelers (i.e., vertically storing dock levelers) are illustrated in the figures described herein, both vertical and horizontal dock levelers (i.e., horizontally storing dock levelers) are within the scope of the present invention and that the sealing systems described herein may be utilized in conjunction with either type of leveler, as well as with other systems not explicitly described herein but that will become apparent to one of skill in the art upon practicing one or more embodiments of the present invention.

The dock leveler system 10 illustrated in FIGS. 1-4 includes a sealing system 12 that is configured to provide a seal between a loading dock and an area outside of the loading dock. More specifically, while a truck or other freight vehicle is being loaded or unloaded from a loading dock, the sealing system 12 is configured to extend between the bottom of the dock leveler system 10 and the pit floor 24 of the loading dock to prevent wind, rain, cold air, hot air, etc, from getting into the loading dock.

The sealing system 12 illustrated in FIGS. 1-4 includes a pad 14. The pad 14 is typically compressible and may include, for example, a commercially available foam at the core thereof. According to certain embodiments of the present invention, the pad 14 is approximately one inch thick. However, pads made from other materials (including non-compressible materials) and having other dimensions are also within the scope of the present invention. Also, the pad 14 illustrated in FIGS. 1-4 extends across substantially the entire width of the dock leveler system 10. However, sealing systems and/or pads that extend more or less than the width of the dock leveler to which they are attached are also with the scope of the present invention.

As illustrated in FIGS. 1-4, the pad 14 has a joint 16 located substantially in the middle thereof. However, pads that do not include a joint or any other kind of hinged region (i.e., pad that are continuous) are also within the scope of the present invention. Typically, these pads are relatively thin (e.g., ⅛-inch or ¼-inch thick). However, thicker pads that do not have joints or any other hinged regions formed or included therein are also within the scope of the present invention.

Further, although a single pad 14 having a joint 16 located therein is illustrated in FIGS. 1-4, other embodiments of the present invention allow for the use of two or more pads or panels to be included in the sealing system 12. According to some such embodiment, the plurality of panels are connected together by, for example, joints or hinges.

The joint 16 illustrated in FIGS. 1-4 extends across substantially the entire width of the pad 14. According to certain embodiments of the present invention, the pad 14 is sandwiched between two layers of protective fabric 18 (e.g., an outdoor fabric such as a woven vinyl-coated polyester). According to some of these embodiments, the joint 16 is formed by sewing the layers of fabric 18 on either side of the pad 14 together, thereby effectively pinching the pad 14. This creates a particularly thin and flexible portion of the pad 14 that acts as a hinge when the dock leveler system is in operation, as will be discussed below. According to other embodiments of the present invention, the sewed joint 16 is replaced by another kind of hinged region that facilitates the portions of the pad on either side of the hinged region moving or flexing relative to each other. This hinged region may include, for example, one or more of a joint, a hinge, and a pivot.

The sealing system 12 illustrated in FIGS. 1-4 also includes a weight 20 that, in FIGS. 1-4, takes the form of a metallic pipe that extends across substantially the entire width of the sealing system 12. The weight 20 illustrated in FIGS. 1-4 is included in a sleeve 22 and the sleeve 22, which also extends across substantially the entire width of the sealing system 12, is attached at a proximate end 34 thereof to a portion of the fabric 18 that surrounds the pad 14. Typically, the proximate end 34 of the sleeve 22 is attached to the fabric 18 via stitching. However, other attachment methods (e.g., gluing, bonding, clamping, bolting, riveting, and other mechanical attachments) are also within the scope of the present invention, as are weights and/or sleeves that extend, either continuously or non-continuously, more or less than the width of the sealing system 12.

Figure 1:
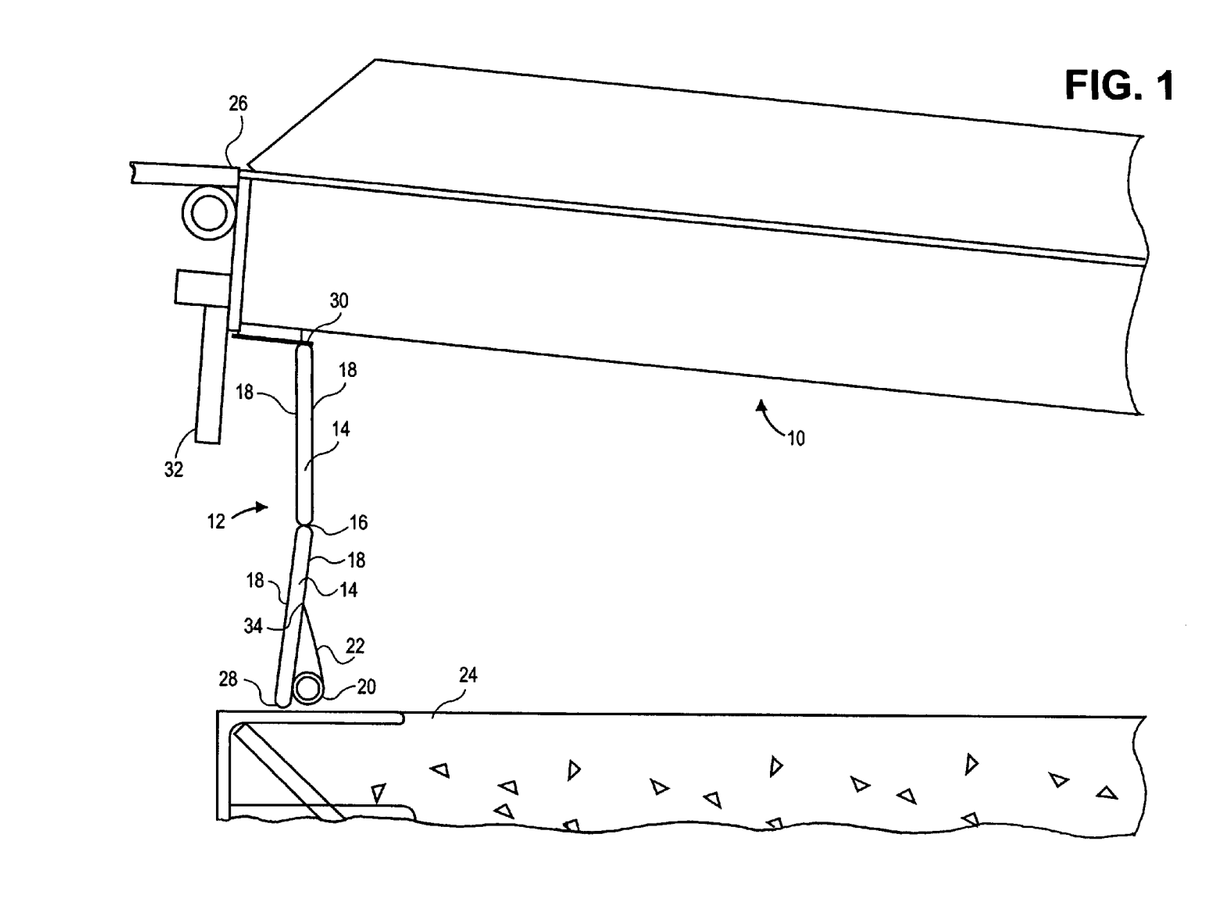
FIG. 1 illustrates a cross-section of a dock leveler system according to a first embodiment of the present invention, wherein the dock leveler system is in a relatively elevated position and wherein a sealing system incorporated therein has not yet come into contact with a pit floor of a loading dock to which the dock leveler system is connected.
Figure 2:
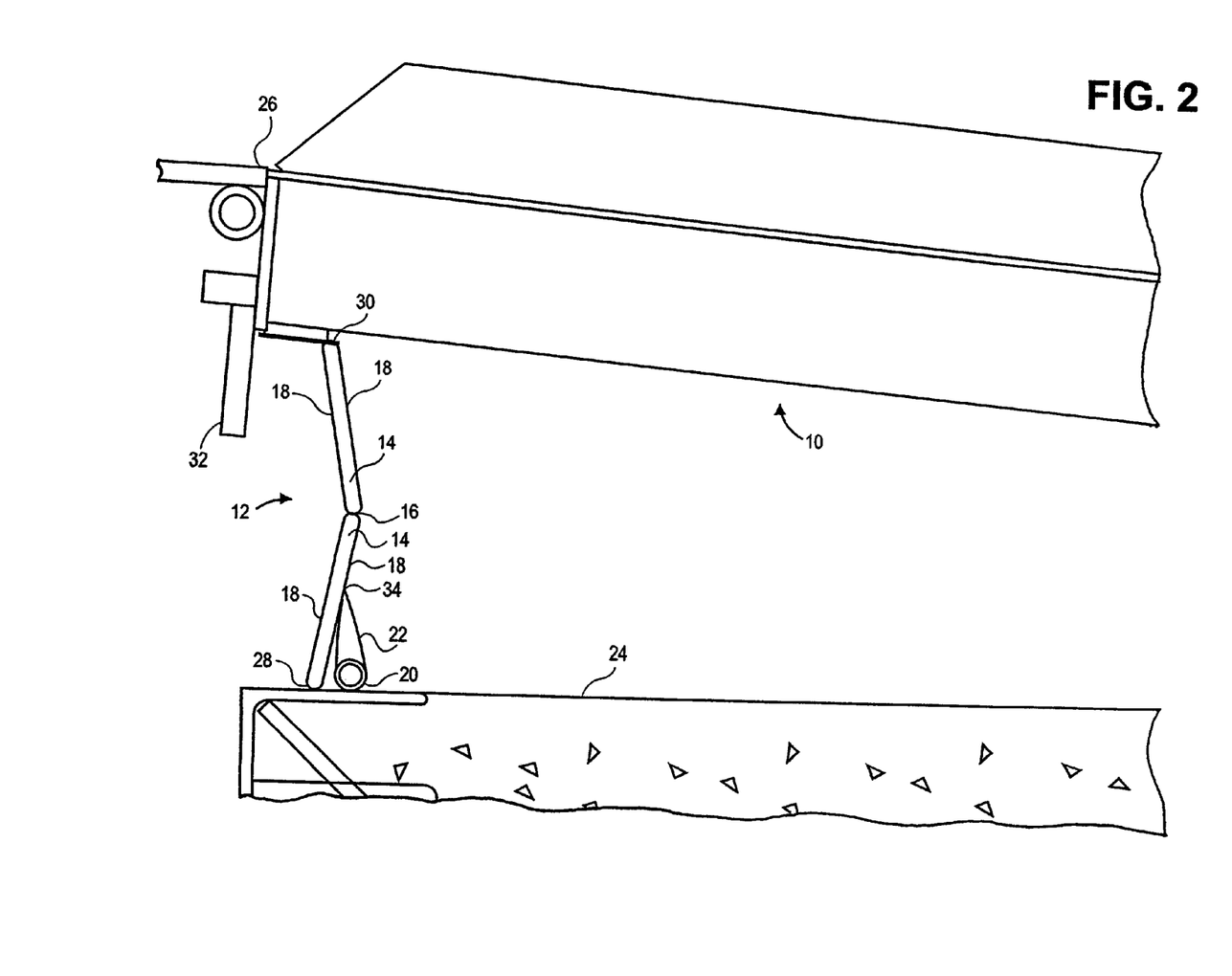
FIG. 2 illustrates a cross-section of the dock leveler system illustrated in FIG. 1 at a lower position wherein the sealing system has come into contact with the pit floor.
Figure 3:
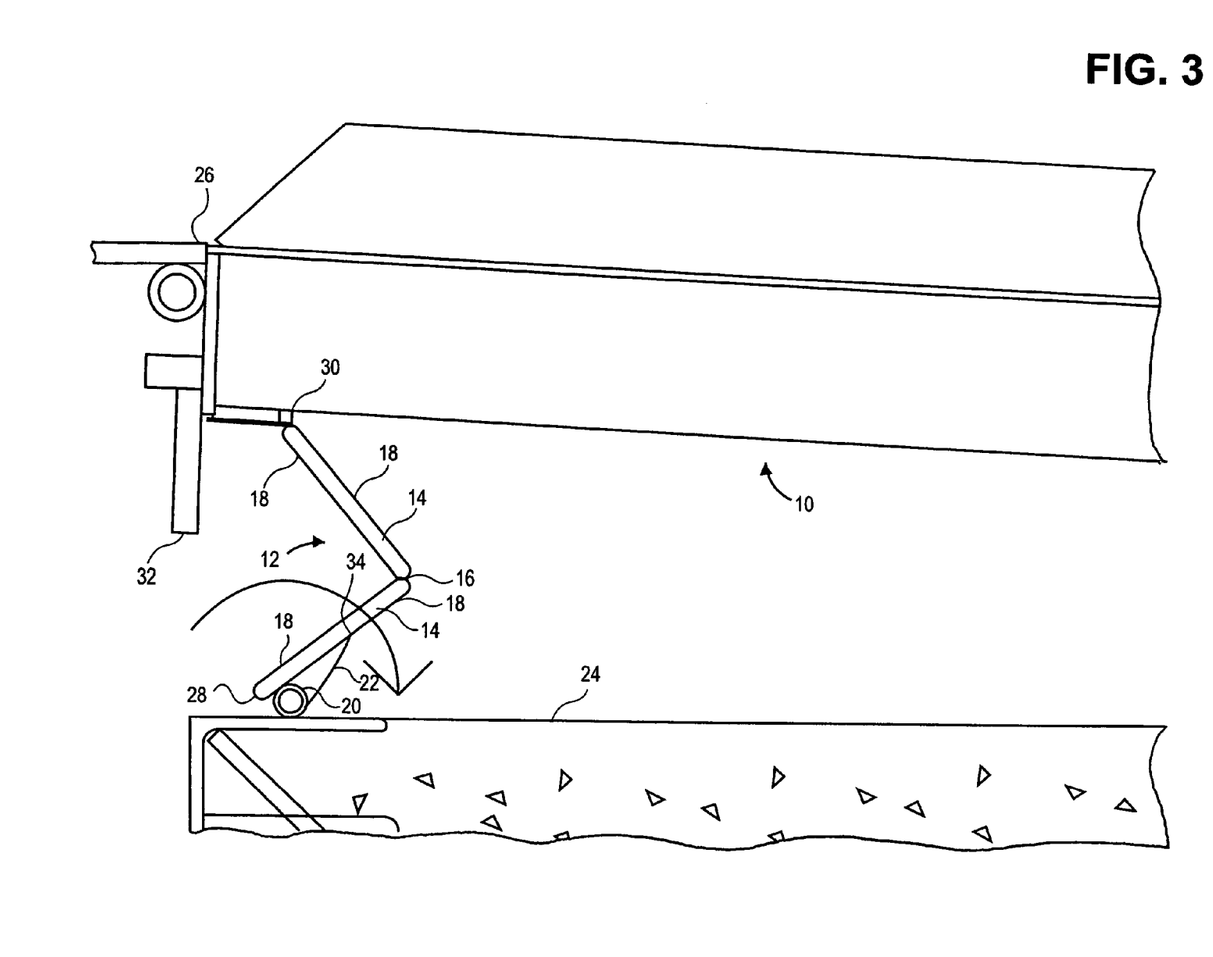
FIG. 3 illustrates a cross-section of the dock leveler system illustrated in FIGS. 1 and 2 at a still lower position wherein the pad has begun to fold at the joint.
Figure 4:
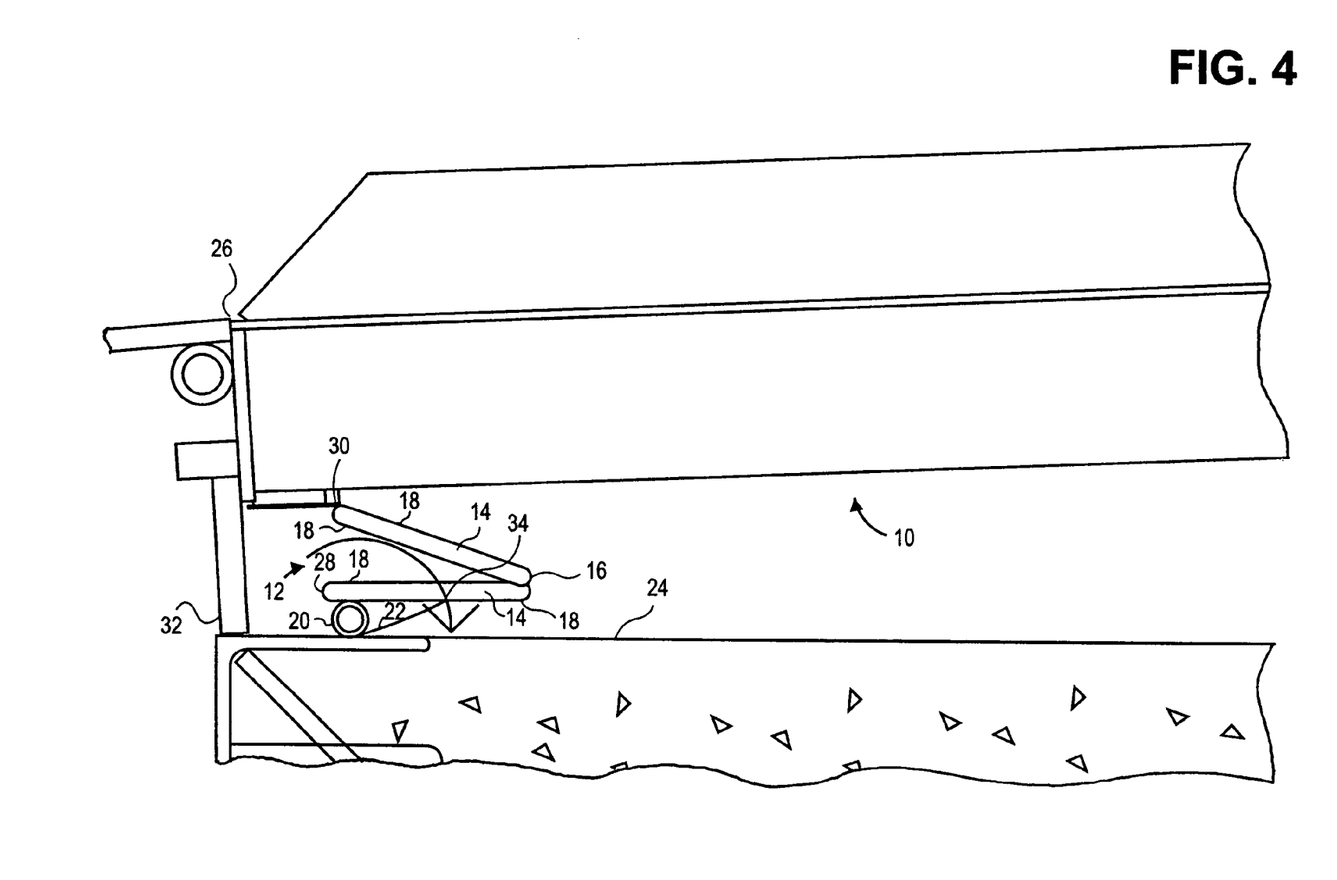
FIG. 4 illustrates a cross-section of the dock leveler system illustrated in FIGS. 1-3 at an even lower position wherein the pad has further folded upon itself.

When no truck or other freight vehicle is positioned adjacent to the loading dock, the dock leveler system 10 illustrated in FIGS. 1-4 is typically kept in an upright (i.e., vertical) position and the system 10 is lowered once a freight vehicle is positioned adjacent to the loading dock. FIG. 1 illustrates the dock leveler system 10 in a relatively elevated position wherein the sealing system 12 has not yet come into contact with the pit floor 24. FIG. 2 illustrates the dock leveler system 10 at a lower position wherein the sealing system 12 has come into contact with the pit floor 24. FIG. 3 then illustrates the dock leveler system 10 at a still lower position wherein the pad 14 has begun to fold at the joint 16. Finally, FIG. 4 illustrates the dock leveler system 10 at a fully lowered position wherein the pad 14 has further folded upon itself.

As illustrated in FIG. 1, the sealing system 12 is attached at a proximate end 30 thereof to the bottom of the dock leveler system 10. This attachment may be done using bolts, screws, rivets, and/or any other suitable means. As also illustrated in FIG. 1, as the sealing system 12 hangs from the bottom of the dock leveler system 10, the gravitational forces on the relatively heavy weight 20 forces the relatively light portion of the pad 14 below the joint 16 to move toward the front end 26 of the dock leveler system 10. In other words, because the gravitational forces on the weight 20 are greater than those on the pad 14, the distal end 28 of the sealing system 12 is forced into a position that is closer to the front end 26 of the dock leveler system 10 than the proximate end 30 of the sealing system 12 that is attached to the dock leveler system 10.

As illustrated in FIG. 2, as the dock leveler system 10 is lowered toward the pit floor 24, the pad 14 and weight 20 eventually come into contact with the pit floor 24. According to certain embodiments of the present invention, the pad 14 comes into contact with the pit floor 24 before the weight 20 does. However, sealing systems 12 where the pad 14 contacts the pit floor 24 at the same time or after the weight 20 are also within the scope of the present invention. Once the pad 14 contacts the pit floor 24, a seal is formed and outside environmental conditions are impeded from entering the loading dock from below the dock leveler system 10 and interior conditioned air is impeded from venting to the outside.

The dock leveler system 10 illustrated in FIG. 1-4 includes a support leg or stop 32 that is typically made from relatively thick piece of metal. As illustrated in FIG. 4, the stop 32 rests against the pit floor 24 when the dock leveler system 10 is fully lowered onto the bed of a freight vehicle (not illustrated) that is adjacent to the loading dock. As will be appreciated by one of skill in the art upon practicing certain embodiments of the present invention, if any portion of the sealing system 12 were to be located between the metallic support leg 32 and the pit floor 24 (typically made of cement or concrete), the relatively fragile components of the sealing system 12 (e.g., the compressible foam pad, the fabric, the stitching) could be crushed, worn, and/or torn.

As such, an advantage of some embodiments of the invention, as shown in FIGS. 1-4, is that the biased distal end 28 and joint 16 ensure that the sealing system 12 will not get trapped between the support leg 32 and the pit floor 24. One way that this is insured, as illustrated in FIG. 3, has to do with the fact that the sealing system 12 is forced by the biased distal end 28 thereof to fold away from the stop 32. The folding in the direction away from the stop 32 is further accommodated by the joint 16, which helps to reduce the likelihood that the pad 14 will be deformed by the dock leveler system 10. As illustrated in FIG. 4, once the dock leveler system 10 is fully lowered, the joint 16 is located further away from the stop 32 than is the proximate end 30 of the sealing system 12 and no portion of the sealing system 12 is included between the stop 32 and the pit floor 24.

Another way that the sealing system 12 is ensured of not getting trapped between the support leg 32 and the pit floor 24 has to do with the substantially spherical cross-sectional shape of the weight 20. More specifically, once the weight 20 makes contact with the pit floor 24 before the distal end 28 of the sealing system, the weight's 20 geometry allows the weight 20 to roll as the dock leveler system 10 is lowered. Since the distal end 28 of the sealing system 12 is attached to the weight 20, as the weight 20 rolls in the direction illustrated in FIGS. 1-4 as the dock leveler system is lowered, the distal end 28 of the sealing system 12 moves away from the support leg 32 and will therefore not get trapped under the support leg 32.

Figure 5:
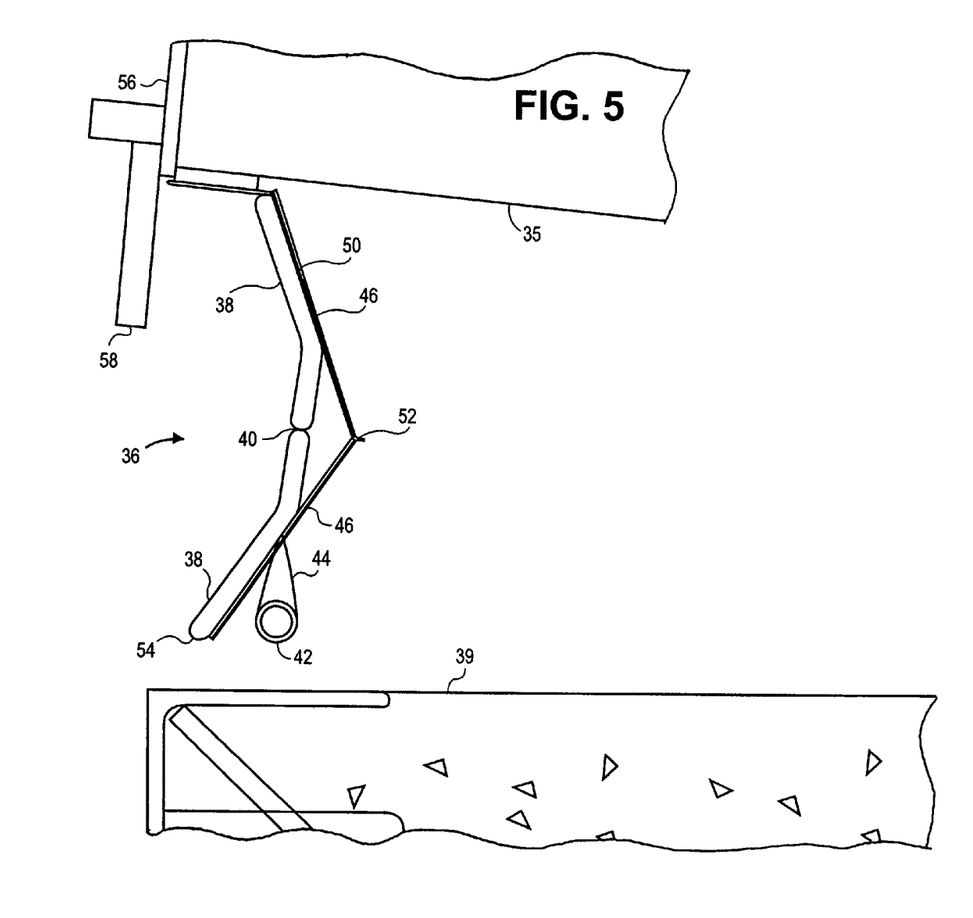
FIG. 5 illustrates a cross-section of a dock leveler system according to a second embodiment of the present invention, wherein the dock leveler system is in a relatively elevated position and wherein a sealing system incorporated therein has not yet come into contact with a pit floor of a loading dock to which the dock leveler system is connected.
Figure 6:
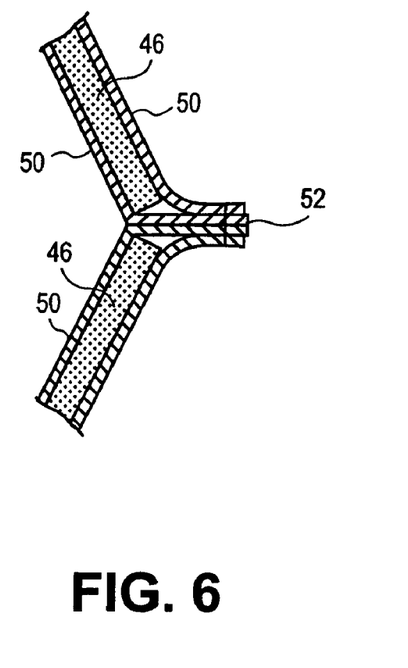
FIG. 6 illustrates a blown-up view of the hinge portion illustrated in FIG. 5.

FIG. 5 illustrates a cross-section of a dock leveler system 35 according to a second embodiment of the present invention, wherein the dock leveler system 35 is in a relatively elevated position and wherein a sealing system 36 incorporated therein has not yet come into contact with a pit floor 39 of a loading dock to which the dock leveler system 35 is connected. FIG. 6 is a blown-up view of the hinge portion 52 illustrated in FIG. 5.

Figure 7:
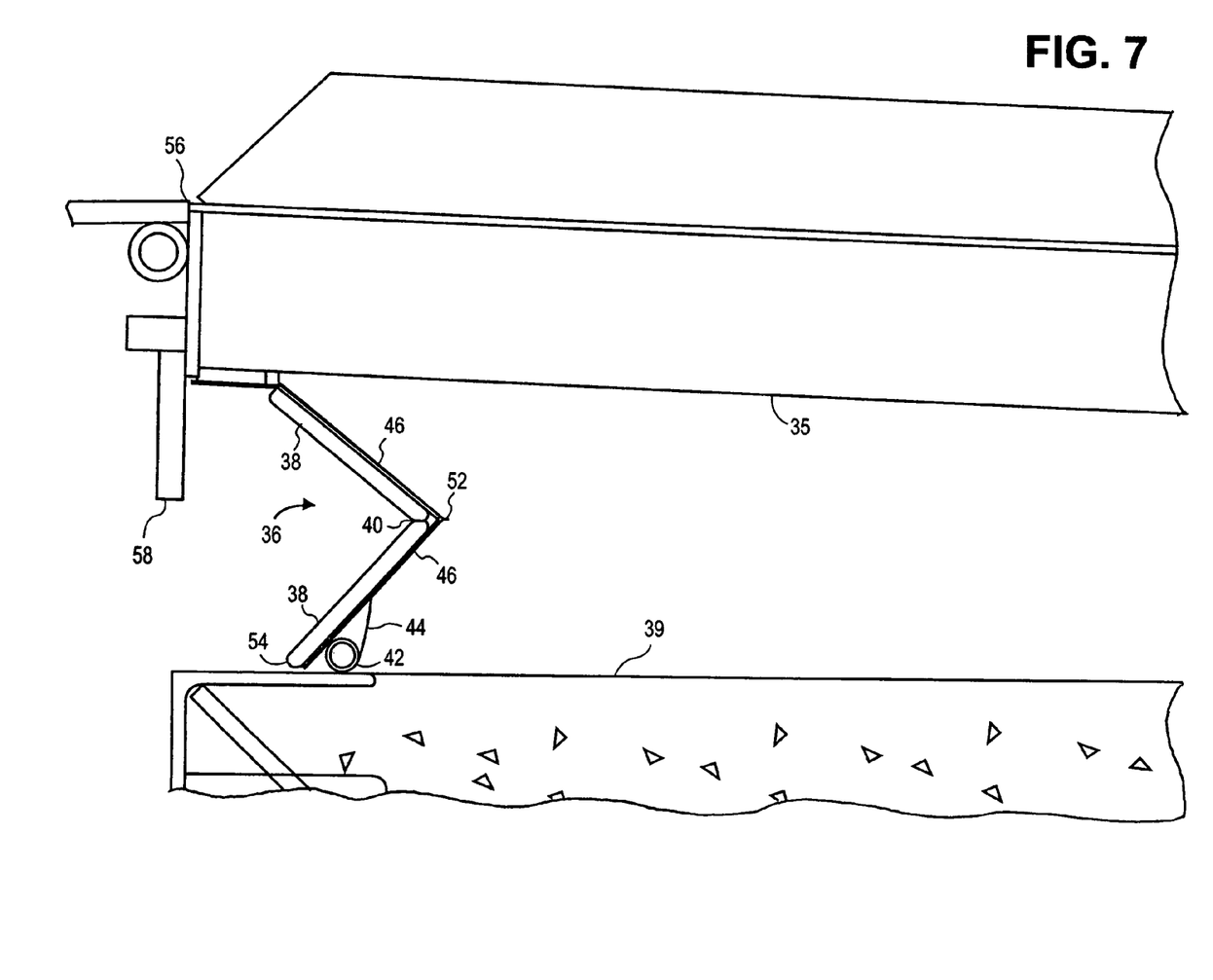
FIG. 7 illustrates a cross-section of the dock leveler system illustrated in FIG. 5 at a lower position wherein the sealing system has come into contact with the pit floor.
Figure 8:
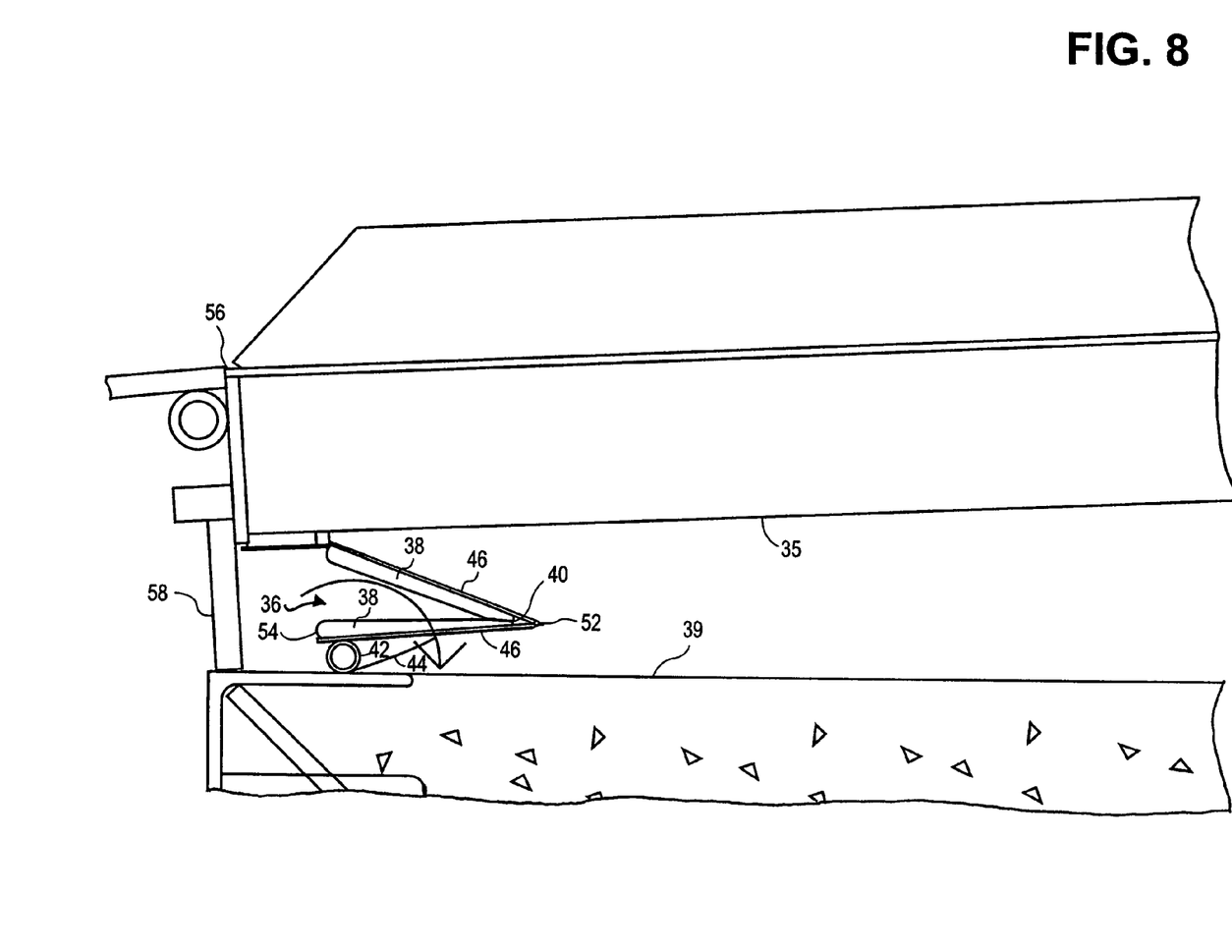
FIG. 8 illustrates a cross-section of the dock leveler system illustrated in FIGS. 5-7 at an even lower position wherein the pad has further folded upon itself.

FIG. 7 illustrates a cross-section of the dock leveler system 35 illustrated in FIG. 5 at a lower position wherein the sealing system 36 has come into contact with the pit floor 39 and FIG. 8 illustrates a cross-section of the dock leveler system 35 at an even lower position wherein the pad 38 has completely folded upon itself.

Like the dock leveler system 10 illustrated in FIGS. 1-4, the dock leveler system 35 illustrated in FIGS. 5-8 includes a pad 38, a joint 40, and a weight 42 included in a sleeve 44 that is attached to the pad 38. However, attached to the pad 38 are two rigid stays 46.

It should be noted that certain embodiments of the present invention make use of only the stays 46 to bias the pad 38. According to these embodiments, the weight 42 and sleeve 44 are not included in the sealing system 36. It should also be noted that, according to certain embodiments of the present invention, no hinge portion 52 is included. Rather, the two rigid stays 46 are formed as one continuous, typically V-shaped, and typically flexible unit. Also, according to certain embodiments of the present invention, a panel (which is typically V-shaped and thermoformed) is used as the stay. Such a panel may, for example, extend across substantially the entire width of the sealing system 36.

According to certain embodiments of the present invention, each stay 46 is made from fiberglass. However, other rigid materials (e.g., metals and metal alloys) may also be used to form the stays 46. As illustrated in FIG. 6, according to certain embodiments of the present invention, each rigid stay 46 (i.e., fiberglass core) may be substantially surrounded by a fabric sleeve 50. Also, according to certain embodiments of the present invention, the fiberglass stays 46 are relatively thin and possess elastic characteristics that allow them to flex like springs. In other words, each of the fiberglass stays 46 is resilient and exerts a force to return to its original shape when deflected. However, according to other embodiments of the present invention, the stays 46 are completely rigid and do not flex any substantial amount.

According to certain embodiments of the present invention, the stays 46 are connected together at a hinge point 52. In the embodiment illustrated in FIG. 6, the fabric sleeves 50 are joined together via stitching. However, alternate methods of connecting the stays 46 together (e.g., gluing, bonding, and riveting) are also within the scope of the present invention.

As illustrated in FIG. 5, because they are rigid, the stays 46, in conjunction with the weight 42, bias the distal end 54 of the pad 38 toward the front end 56 of the dock leveler system 35 more than the weight 42 would if it were acting by itself. Thus, the likelihood is reduced that the sealing system 36 will get trapped between the stop 58 and the pit floor 39.

The hinge point 52 and, when the stays 46 are flexible, the springlike characteristics of the stays 46 allow for the stays 46 to fold onto each other. As such, when the dock leveler system 35 is moved to a lowered position, as shown in FIG. 8, the sealing system 36 has collapsed upon itself and easily fits under the dock leveler system 35.

As shown in FIGS. 5-8, the weight 42 is included in a sleeve 44 that is attached to the pad 38. However, according to other embodiments of the present invention, the sleeve 44 may also be attached to one or more of the stays 46 that are present, usually at regular intervals, along the width of the sealing system 36.

Figure 9:
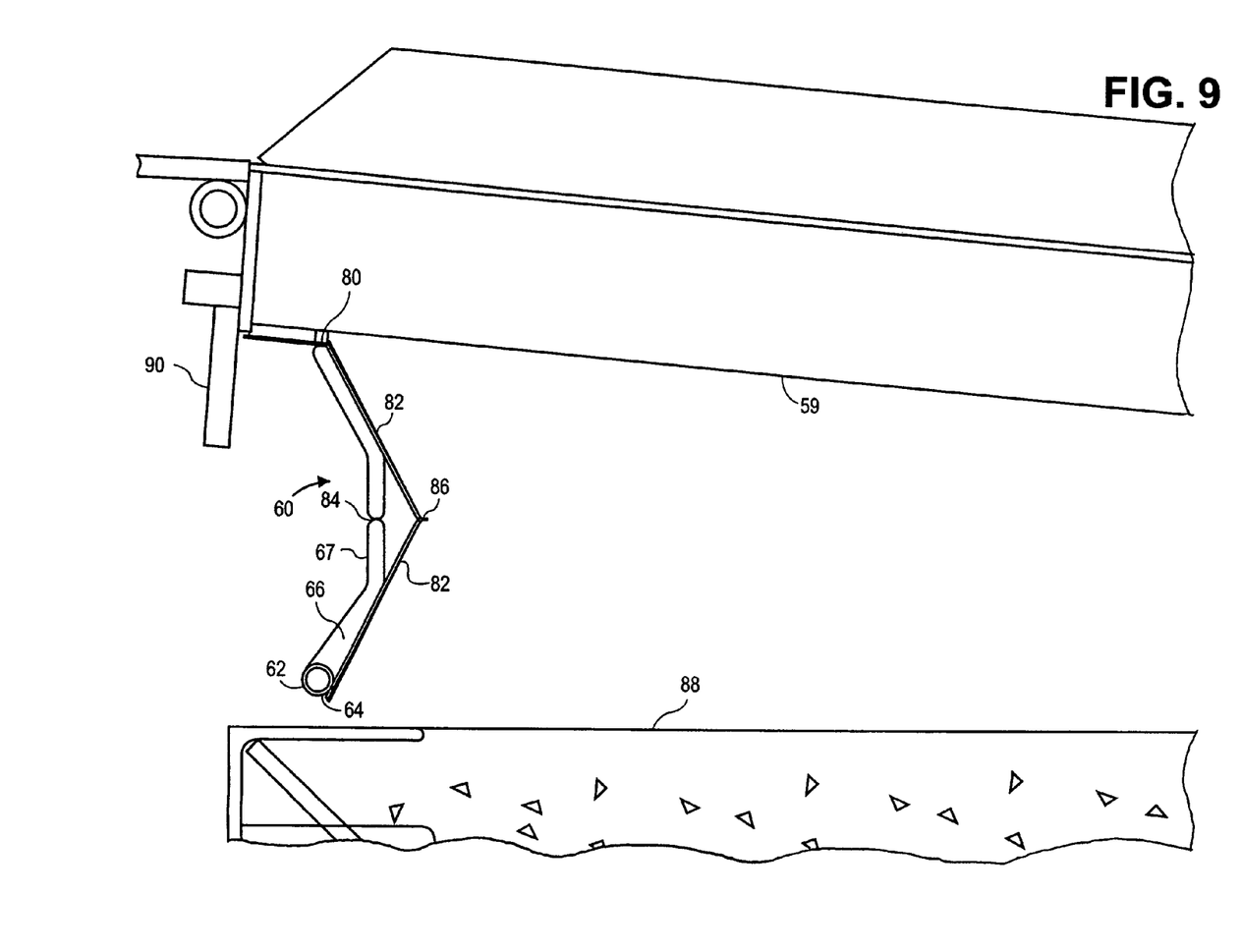
FIG. 9 illustrates a cross-sectional view of yet another sealing system wherein a weight is attached to the distal end of a pad.

FIG. 9 illustrates a cross-sectional view of yet another sealing system 60 according to yet another embodiment of the present invention. As illustrated in FIG. 9, the sealing system 60 is attached to a dock leveler system 59 at a proximate end 80 thereof and a weight 62 is attached to the distal end 64 of a pad 66. The dock leveler system 59 is positioned above a pit floor 88 and has a support leg 90. The sealing system 60 illustrated in FIG. 9 also includes stays 82, a joint 84 formed in the pad 66 and a hinge portion 86 at the intersection of the stays 82. According to this embodiment, a separate sleeve is not necessary to house the weight 62. Rather, the weight 62 may, for example, be incorporated directly within a fabric layer 63 that surrounds the pad 66.

According to certain embodiments of the present invention, the stays 82 and the pad 66 are interconnected (e.g., stitched together) in such a manner as to prevent the hinge portion 86 from expanding (i.e., from forming a wider "V" shape). In effect, since the pad 66 cannot be substantially elongated under tensile stress, the stays 82 which are connected to the pad 66 cannot substantially move apart from one another and this keeps the sealing system 60 in a biased position. As such, the sealing system 60 is protected from being placed in a position that would cause it to be pinned under the support leg 90 of the dock leveler system 59.

Figure 10:
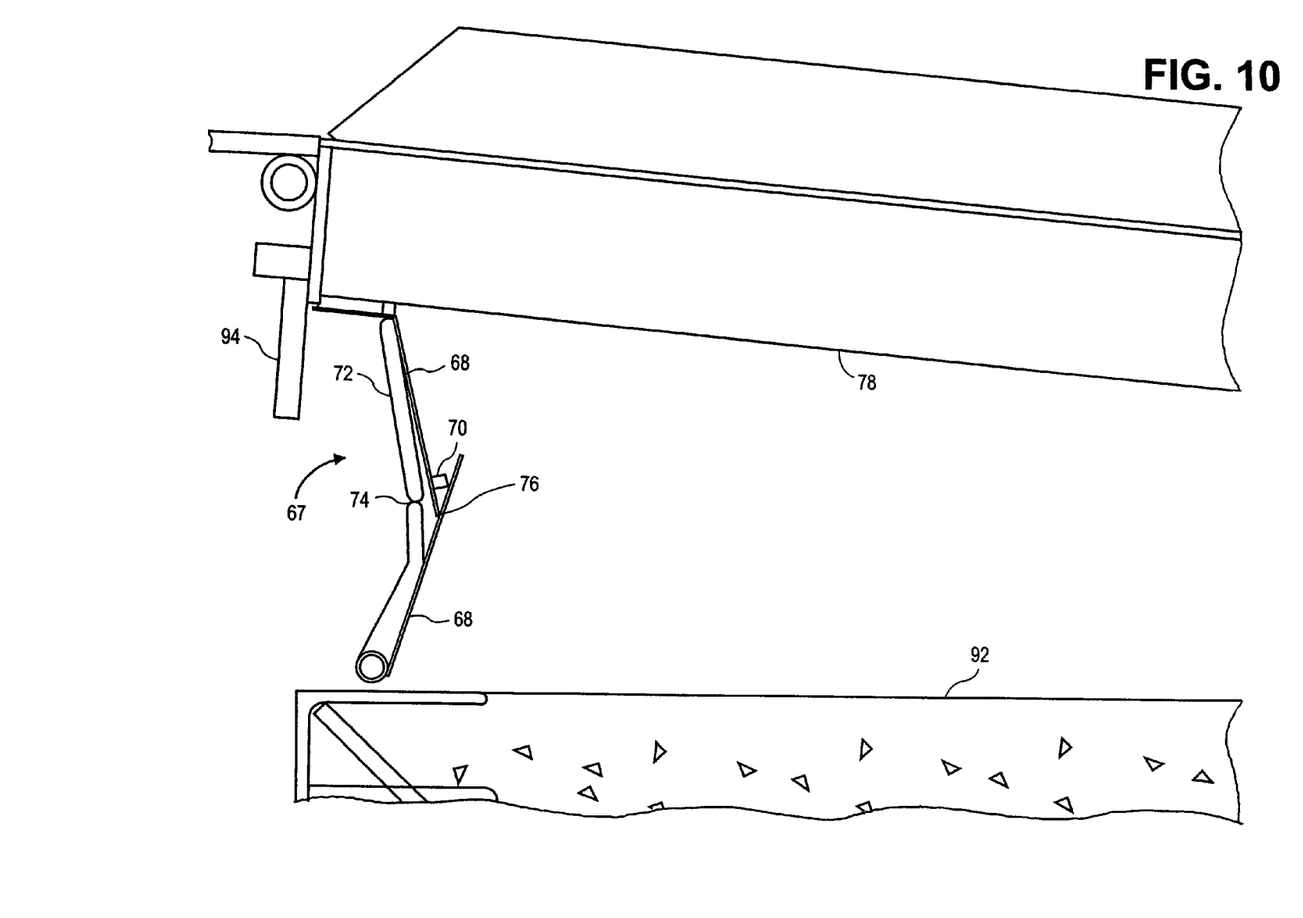
FIG. 10 illustrates a cross-sectional view of still another sealing system wherein two stays and a spacer are included.

FIG. 10 illustrates a cross-sectional view of still another sealing system 67 wherein two stays 68 and a spacer 70 are included. The sealing system 67 is attached to a dock leveler system 78 that is positioned above a pit floor 92 and that includes a stop 94. Unlike the embodiments of the present invention illustrated in FIGS. 5-8, the stays 68 illustrated in FIG. 10 are not connected at a flexible hinge point. Rather, the stays 68 are connected (e.g., stitched, glued, or bonded) directly to the pad 72 either above or below the joint 74. Then, the above-mentioned spacer 70 is affixed (e.g., bolted, screwed, riveted, glued, or bonded) to one of the stays 68. The spacer 70 then prevents the stays 68 from directly contacting each other at any point other than the distal end 76 of the upper stay 68 illustrated in FIG. 10.

Figure 11:
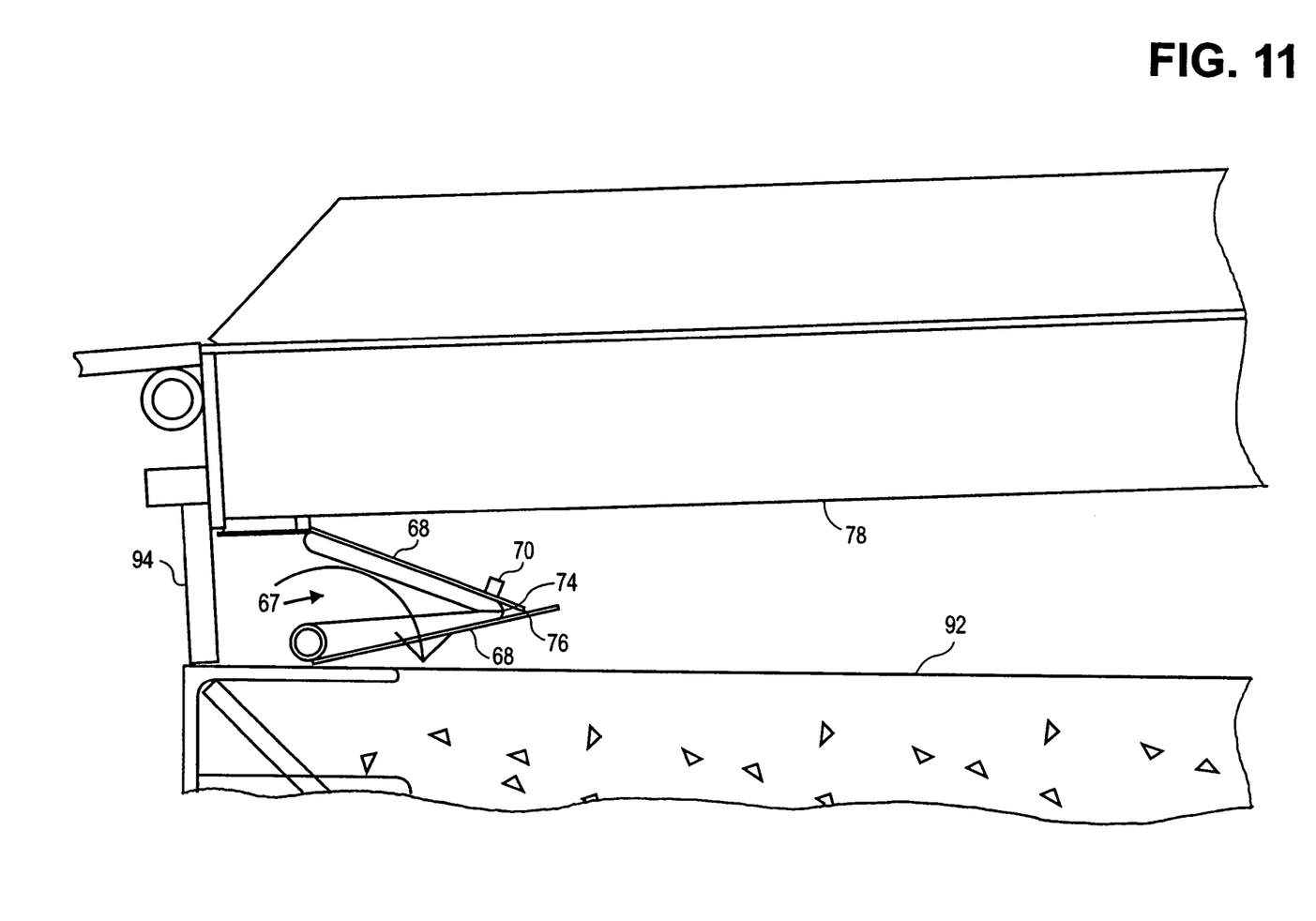
FIG. 11 illustrates a cross-section of the sealing system illustrated in FIG. 10 while the dock leveler is fully lowered.

FIG. 11 illustrates a cross-section of the sealing system 67 illustrated in FIG. 10 while the dock leveler 78 is fully lowered. As illustrated in FIG. 1, the stays 68 accommodate the lowering of the dock leveler 78 by sliding relative to each other and thereby again allow the sealing system 67 to fit below the dock leveler 78.

According to yet other embodiments of the present invention, methods of providing a seal between a loading dock and an area outside of the loading dock are provided. These methods typically make use of one or more of the components and/or systems described above. However, the use of other components and/or systems to implement these methods is also within the scope of the present invention.

According to one embodiment of the present invention, the method includes attaching a barrier to a dock leveler. This attachment step may be implemented, for example, by bolting, screwing, gluing, clamping, sewing, bonding, or riveting the barrier to the dock leveler.

The method also includes including a hinged region in the barrier to facilitate one portion of the barrier moving with respect to a second portion of the barrier. This step may be implemented, for example, by providing a compressible pad (e.g., a foam pad), providing a fabric substantially surrounding the compressible pad, and stitching through the pad and the fabric to locally compress the pad The method further includes biasing the first portion of the barrier relative to the second portion of the barrier. This biasing step may be implemented, for example, by attaching a weight to the barrier and allowing the gravitational force exerted upon the weight to bias the second portion of the barrier.

The biasing step may also be implemented, for example, by attaching a first rigid portion (i.e., a fiberglass stay) to a first portion of the barrier and a second rigid portion to the second portion of the barrier. Then, the first rigid portion may be positioned to be in contact with the second rigid portion According to these embodiments of the present invention, the first rigid portion and the second rigid portion may be attached directly to each other. However, the rigid portions may be attached individually to the barrier and a spacer may be attached to the first rigid portion at a location that also allows the spacer to be in contact with the second rigid portion.

According to still another embodiment of the present invention, the biasing step causes the barrier to fold away from components of the dock leveler that come into contact with a floor of a dock when the dock leveler is in operation. As such, it becomes very unlikely that the sealing mechanism will be damaged as the dock leveler is operated.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A dock leveler sealing system, comprising:
   a barrier configured to be attached to a dock leveler;
   hinged region located in the barrier and configured to facilitate one portion of the barrier moving with respect to a second portion of the barrier; and
   biasing apparatus attached to the barrier and configured to position the first portion of the barrier at a bias relative to the second portion of the barrier, the biasing apparatus comprising a weight incorporated into a sleeve that is attached to the barrier at a first end of the sleeve and that is detached from the barrier at a second end of the sleeve.

2. The dock leveler sealing system of claim 1, wherein the barrier comprises a compressible pad.

3. The dock leveler sealing system of claim 2, wherein the barrier further comprises fabric substantially surrounding the compressible pad and wherein the hinged region comprises stitching through the pad and the fabric.

4. The dock leveler sealing system of claim 1, wherein the weight extends substantially continuously across an entire dimension of the barrier.

5. The dock leveler sealing system of claim 1, wherein the barrier comprises a compressible pad and a fabric that substantially surrounds the compressible pad and wherein the weight is substantially surrounded by the fabric.

6. A method of providing a seal between a loading dock and an area outside of the loading dock, the method comprising:
   attaching a barrier to a dock leveler;
   including a hinged region in the barrier to facilitate one portion of the barrier moving with respect to a second portion of the barrier; and
   biasing the first portion of the barrier relative to the second portion of the barrier by attaching a first end of a sleeve to the barrier, having a second end of the sleeve remain detached from the barrier, and incorporating a weight into the sleeve.

7. The method of claim 6, wherein the including step comprises providing a compressible pad and a fabric substantially surrounding the compressible pad and stitching through the pad and the fabric to locally compress the pad and thereby form the hinged region.

8. The method of claim 6, wherein the biasing step causes the barrier to fold away from components of the dock leveler that come into contact with a pit floor when the dock leveler is in operation.

9. The dock leveler sealing system of claim 1, wherein the barrier, hinged region, and biasing apparatus avoid contacting a support leg of the dock leveler and a pit floor when the dock leveler is a lowered position and the barrier is folded on itself.

10. The dock leveler sealing system of claim 9, wherein the barrier is forced by the biased distal end of the barrier by the biasing apparatus to fold away from the support leg.

* * * * *